US008761800B2

(12) United States Patent
Kuwahara (10) Patent No.: US 8,761,800 B2
(45) Date of Patent: Jun. 24, 2014

(54) INFORMATION-PROCESSING DEVICE, SERVER DEVICE, INFORMATION-PROCESSING METHOD, COMPUTER-READABLE STORAGE MEDIUM, COMMUNICATION SYSTEM, AND COMMUNICATION METHOD

(75) Inventor: Masato Kuwahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/565,288

(22) Filed: Aug. 2, 2012

(65) Prior Publication Data

US 2013/0310079 A1 Nov. 21, 2013

(30) Foreign Application Priority Data

May 17, 2012 (JP) ................................. 2012-113012

(51) Int. Cl.
*H04W 40/02* (2009.01)
(52) U.S. Cl.
USPC ............... 455/456.3; 463/42; 463/9; 701/469
(58) Field of Classification Search
USPC ....... 455/456.3; 463/42, 9; 340/539; 701/469
See application file for complete search history.

(56) References Cited

U.S. PATENT DOCUMENTS

| 6,674,995 | B1 | 1/2004 | Meyers et al. |
| 2002/0142764 | A1 | 10/2002 | Newell et al. |
| 2004/0243308 | A1* | 12/2004 | Irish et al. ..................... 701/213 |
| 2005/0012611 | A1* | 1/2005 | Osman ..................... 340/539.13 |
| 2006/0068702 | A1 | 3/2006 | Miwa et al. |
| 2009/0036186 | A1* | 2/2009 | Benco et al. ..................... 463/9 |
| 2009/0186694 | A1* | 7/2009 | Gunawardana et al. ......... 463/31 |
| 2009/0286570 | A1 | 11/2009 | Pierce, Jr. |
| 2011/0039622 | A1* | 2/2011 | Levenson ..................... 463/42 |
| 2011/0190063 | A1* | 8/2011 | Kajii ..................... 463/42 |
| 2012/0295704 | A1* | 11/2012 | Reiche et al. .................. 463/31 |
| 2013/0178257 | A1* | 7/2013 | Langseth ..................... 463/4 |

FOREIGN PATENT DOCUMENTS

JP 2008-154620 7/2008

OTHER PUBLICATIONS

Non-final Office Action in U.S. Appl. No. 13/549,924 dated Mar. 28, 2013.

* cited by examiner

*Primary Examiner* — Jinsong Hu
*Assistant Examiner* — Jean Chang
(74) *Attorney, Agent, or Firm* — Nixon & Vanderhye, P.C.

(57) ABSTRACT

An exemplary information-processing device includes: a terminal position-acquiring unit configured to acquire a position of a portable terminal used by a user; a specified position-acquiring unit configured to acquire a position specified by the user; an event-generating unit configured to generate an event at a generation position, the position acquired by the specified position-acquiring unit being regarded as the generation position; and a transmitting unit configured to transmit information relating to the event to the portable terminal when the position acquired by the terminal position-acquiring unit and the generation position come to be in a predetermined positional relationship.

19 Claims, 5 Drawing Sheets

| OBJECT ID OF FIRST OBJECT | OBJECT ID OF SECOND OBJECT |
|---|---|
| I01 | i02 |
| I02 | i03,i04 |
| I03 | i04 |
| ... | ... |

FIG. 4

| GROUP ID | USER ID OF USER(S) IN THE GROUP |
|---|---|
| G01 | U001,U002 |
| G02 | U003 |
| G03 | U004~U010 |
| ... | ... |

FIG. 5

| USER ID | U001 | | | |
|---|---|---|---|---|
| OBJECT ID OF FIRST OBJECT | POSITION INFORMATION | SPECIFIED DATE AND TIME | OBJECT ID OF SECOND OBJECT | GENERATION DATE AND TIME |
| I01 | X1,Y1 | 2012.01.01 10:00 | I02 | 2012.01.01 15:00 |
| I02 | X2,Y2 | 2012.01.01 11:30 | NULL | NULL |
| I01 | X3,Y3 | 2012.01.01 12:05 | NULL | NULL |
| ... | ... | ... | ... | ... |

FIG. 11

INFORMATION-PROCESSING DEVICE, SERVER DEVICE, INFORMATION-PROCESSING METHOD, COMPUTER-READABLE STORAGE MEDIUM, COMMUNICATION SYSTEM, AND COMMUNICATION METHOD

CROSS REFERENCE TO RELATED APPLICATIONS

This application is based on and claims priority under 35 USC 119 from Japanese patent application No. 2012-113012, which was filed on May 17, 2012.

FIELD

The technology disclosed herein relates to generating an event and presenting information relating to the event to a user.

BACKGROUND AND SUMMARY

Role-playing games in which a character operated by a user acquires objects such as money, a weapon, or a monster, and uses these objects to perform various types of trading or ways of fighting are known.

An exemplary embodiment provides technology for allowing an intention of a user to influence generation of an event.

An exemplary embodiment provides an information-processing device including: a terminal position-acquiring unit configured to acquire a position of a portable terminal used by a user; a specified position-acquiring unit configured to acquire a position specified by the user; an event-generating unit configured to generate an event at a generation position, the position acquired by the specified position-acquiring unit being regarded as the generation position; and a transmitting unit configured to transmit information relating to the event to the portable terminal when the position acquired by the terminal position-acquiring unit and the generation position come to be in a predetermined positional relationship.

BRIEF DESCRIPTION OF THE DRAWINGS

Exemplary embodiments will now be described with reference to the following drawings, wherein.

DETAILED DESCRIPTION OF NON-LIMITING EXEMPLARY EMBODIMENTS

1. Exemplary Embodiment

1-1. Configuration

Figure 1:
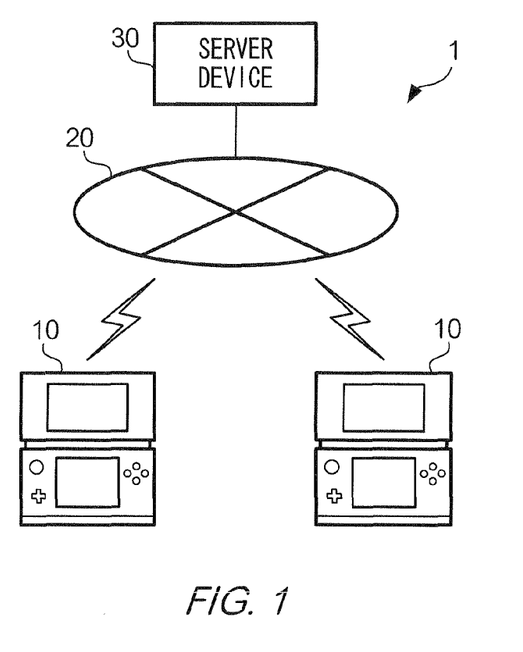
FIG. 1 shows an exemplary non-limiting configuration of a communication system relating to an exemplary embodiment.

FIG. 1 is a diagram showing a configuration of communication system 1 relating to an exemplary embodiment. Communication system 1 includes multiple portable terminals 10 used by respective users, communication network 20, and server device 30. Each portable terminal 10 is a computer that executes programs; for example, a program describing a procedure on a client side in a role-playing game. Server device 30 is a computer that executes programs. Server device 30 executes a program describing a procedure on a server side in the aforementioned role-playing game to provide the role-playing game to users of portable terminals 10 in a so-called online mode. Communication network 20 is a network connecting each of multiple portable terminals 10 with server device 30. Communication network 20 includes a mobile communication network based on, for example, GSM (registered trademark) (Global System for Mobile Communications), 3G, or LTE (Long Term Revolution), and a given fixed communication network.

The aforementioned role-playing game includes a stage in which a character representing a user of portable terminal 10 gathers, in a virtual space, various types of characters such as animals or monsters. In this exemplary embodiment, the virtual space resembles a real three-dimensional space. However, the virtual space is not limited thereto, and may be other than three-dimensional. The virtual space may be two dimensional, like a planar map, for example. In the explanation below, a position in the virtual space and a position in the actual space are distinguished from each other by referring to the former as a "virtual position" and the latter as an "actual position," where appropriate.

The procedure for gathering characters in a virtual space in which a role-playing game is conducted may be as follows. First, a user specifies a desired virtual position in the virtual space, and places at the virtual position a first object representing bait or a trap. The virtual position at which the first object is placed at this time may be a virtual position corresponding to an actual position on a route that the user often uses in real space, such as a commuting route from the user's home to the workplace, or the like. After a few moments from placement of the first object, a second object representing a character such as an animal or a monster appears at the virtual position where the first object is placed, simulating a situation that a character is attracted to the bait or caught by the trap, where the bait or the trap is represented by the first object. It is to be noted here that a second object does not necessarily appear, and the probability of appearance of a second object is less than 1 (one) (less than 100% when expressed as a percentage). Further, even when a second object appears, it may disappear after a certain period of time.

Thus, a possibility that a second object appears in the virtual space is limited. If, during appearance of a second object, the user again passes the actual position corresponding to the virtual position at which the second object has appeared, the user can acquire the second object. A user who can acquire a second object in this way is not limited to the user who has placed a first object in the virtual space, and may be another user who belongs to the same group to which the user who has placed the first object belongs, such as a friend of this user. A user can use the thus-acquired second object to trade with or to fight against another user in the virtual space.

As is described in the foregoing, a possibility that a second object may appear is caused to arise at the virtual position specified by a user as a position of placement of a first object, and thus, a user can reflect her/his intention on the position where a second object may appear. That is, it is possible to allow an intention of a user to influence generation of an event, in which a second object appears at the virtual position specified as a position of placement of a first object in the virtual space relating to the real, three-dimensional space.

Further, since the period during which a second object appears is limited, a user may successfully acquire a second object or may miss an opportunity to do so. Such unpredictability or uncertainty makes the game more entertaining. Furthermore, a user can acquire a second object that has appeared in response to a first object placed by another user belonging to the same group. Therefore, a user encounters novel entertaining situations, such as a situation in which the user and another user belonging to the same group notify each other of an acquired second object, or a situation in which the user informs another user belonging to the same group where a second object has appeared and asks the other user to acquire the second object.

Figure 2:
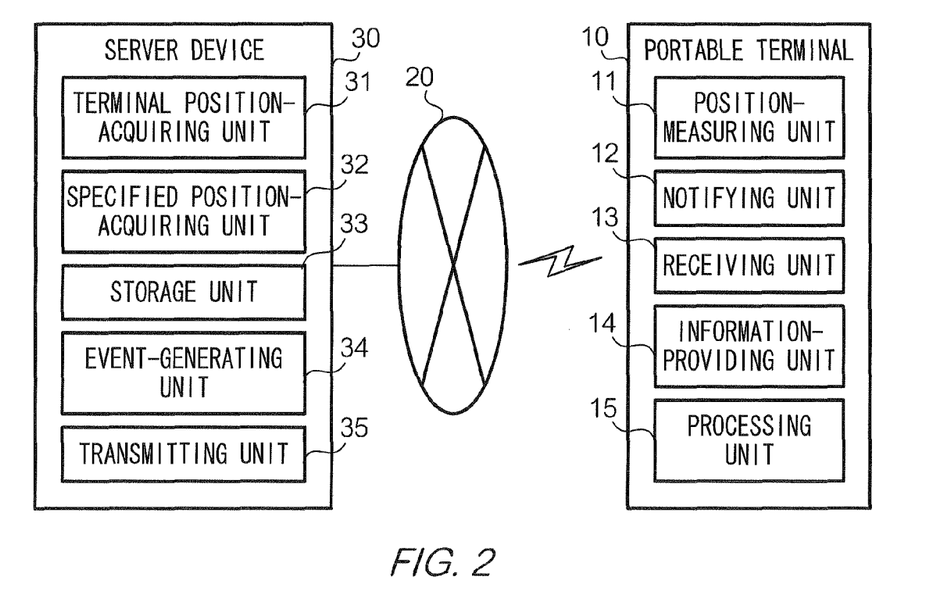
FIG. 2 shows an exemplary non-limiting functional configuration of a communication system.

FIG. 2 is a diagram showing a functional configuration of communication system 1. Server device 30 includes terminal position-acquiring unit 31, specified position-acquiring unit 32, storage unit 33, event-generating unit 34, and transmitting unit 35. Terminal position-acquiring unit 31 acquires the position of portable terminal 10 notified by the same. Specified position-acquiring unit 32 acquires the position specified by the user of portable terminal 10. Storage unit 33 stores a first object in association with the position acquired by specified position-acquiring unit 32. Event-generating unit 34 generates an event at a generation position with a probability of less than one, based on an algorithm prepared in advance, the position acquired by the specified position-acquiring unit 32 being regarded as the generation position. It is to be noted that an event here is an event in which a second object different from a first object stored in storage unit 33 appears in relation to the position acquired by specified position-acquiring unit 32. The term "appears in relation to the position acquired by specified position-acquiring unit 32" means not only that, in a case where the position acquired by specified position-acquiring unit 32 is a real position, a second object appears at a virtual position corresponding to the real position, but also that, in a case where the position acquired by the specified position-acquiring unit 32 is a virtual position (refer to Modification 5 described later), a second object appears at the virtual position. When the position acquired by terminal position-acquiring unit 31 and the position where an event is generated by event-generating unit 34 come to be in a predetermined positional relationship, such as when the position acquired by terminal position-acquiring unit 31 comes to overlap the position where an event has been generated by event-generating unit 34, transmitting unit 35 transmits information relating to the event to portable terminal 10. Information relating to the event here is, for example, information for notifying a user of a second object that has appeared. One example of such information is an object ID, which is identification information allocated to a second object.

Portable terminal 10 includes position-measuring unit 11, notification unit 12, receiving unit 13, information-providing unit 14, and processing unit 15. Position-measuring unit 11 measures a position of portable terminal 10. Notifying unit 12 notifies server device 30 of the position specified by a user. Receiving unit 13 receives information transmitted from server 30, that is, information relating to the aforementioned event. Information-providing unit 14 provides the user with the information received by receiving unit 13. This enables the user to know what kind of event has been generated. In this example, the user is informed of a second object that has appeared in the virtual space. Processing unit 15 executes a process relating to an event in accordance with an operation performed by the user. A process relating to an event herein is, for example, a process of storing a second object that has appeared in a state such that the stored second object can be used in a role-playing game.

Figure 3:
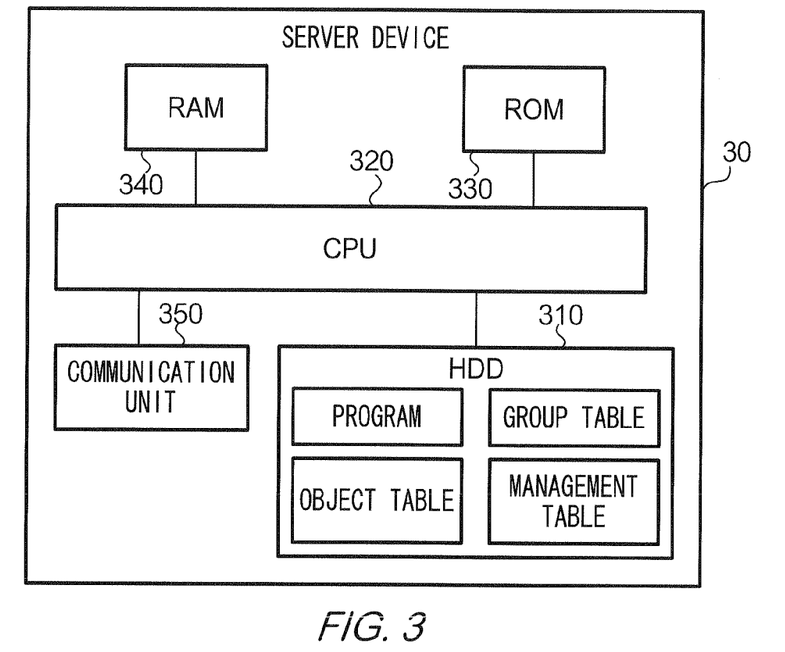
FIG. 3 shows an exemplary non-limiting hardware configuration of a server device relating to an exemplary embodiment.

FIG. 3 is a diagram showing a hardware configuration of server device 30. Server device 30 includes HDD (Hard Disk Drive) 310, CPU (Central Processing Unit) 320, ROM (Read Only Memory) 330, RAM (Random Access Memory) 340, and communication unit 350. CPU 320 is a control device or an arithmetic device. CPU 320 and communication unit 350 function as terminal position-acquiring unit 31, specified position-acquiring unit 32, and event-generating unit 34 shown in FIG. 2 by executing a program(s) stored in HDD 310. Further, CPU 320 and communication unit 350 function as transmitting unit 35 shown in FIG. 2. Furthermore, CPU 320 measures a date and time by executing a program(s) stored in HDD 310. ROM 330 is a nonvolatile storage device storing an OS (Operating System) program, which is a base program. RAM 340 is a volatile storage device functioning as a work area when CPU 320 executes a program(s). Communication unit 350 is a device for performing communication via communication network 20, which may include the Internet, and includes a network interface, for example.

HDD 310 is a nonvolatile storage device. HDD 310 functions as storage unit 33 shown in FIG. 2. HDD 310 stores three types of tables; namely, an object table, a group table, and a management table, in addition to programs, in which procedures for a role-playing game on the server side are described. The object table sets forth a second object(s) that can appear for each first object. The group table is a table for managing groups to which users belong. The group table sets forth a user(s) who can acquire a second object that has appeared in correspondence with a first object. The management table is a table for managing, for each user, a state of arrangement of first objects or a state of generation of an event where a second object appears.

The aforementioned first object can be any of multiple kinds of objects; for example, meat bait, fish bait, grass bait, grain bait, a large-sized trap, a medium-sized trap, a small-sized trap, and so on. Corresponding to these kinds of first objects, there are multiple kinds of second objects, such as a carnivorous dinosaur, a herbivorous dinosaur, a large mammal, a medium-sized mammal, a small mammal, a bird, etc. It is predetermined which kind(s) of animal(s) or monster(s) may appear for each kind of bait or trap. For example, for a first object of "meat bait," a second object that may appear is a "carnivorous dinosaur"; for a first object of "grass bait," a second object that may appear is a "herbivorous dinosaur" or a "large mammal"; and so on.

Figure 4:
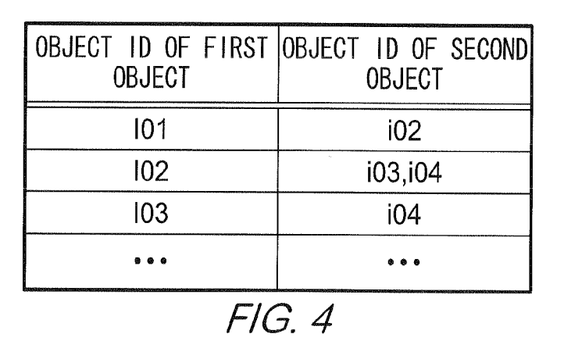
FIG. 4 shows a non-limiting example of an object table.

FIG. 4 is a diagram showing an example of an object table stored in HDD 310. In the object table, an object ID (identification information) assigned to each first object is associated with an object ID assigned to each second object that may appear in correspondence with the first object. In the example of FIG. 4, if a first object with object ID "I01" represents "meat bait," for example, a second object with object ID "i02," which represents a "carnivorous dinosaur," may appear.

Figure 5:
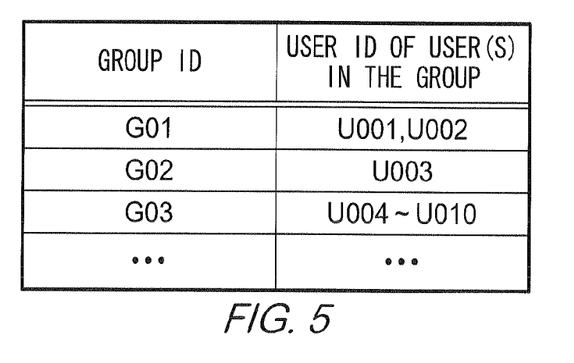
FIG. 5 shows a non-limiting example of a group table.

FIG. 5 is a diagram showing an example of a group table stored in HDD 310. As is described in the foregoing, a group table is a table setting forth a user(s) who can acquire a second object that has appeared in correspondence with a first object. In the group table, a group ID (identification information) assigned to each group is associated with a user ID (identification information) assigned to each user belonging to the group. The correspondence relationship is indicated by a user when the user executes a program of a role-playing game on portable terminal 10. The content of the indication is notified from portable terminal 10 to server device 30, and is written in the group table.

For example, users having user ID "U001" and having user ID "U002" belong to the group having group ID "G01." In this case, if the user having user ID "U001" places a first object in a virtual space, not only the user having user ID "U001" (the user of first portable terminal 10), but also the user having user ID "U002" (the user of second portable terminal 10) can acquire a second object that has appeared at the virtual position of the first object. Similarly, if the user having user ID "U002" places a first object in a virtual space, not only the user having user ID "U002," but also the user having user ID "U001" can acquire a second object that has appeared at the position of the first object.

Figure 6:
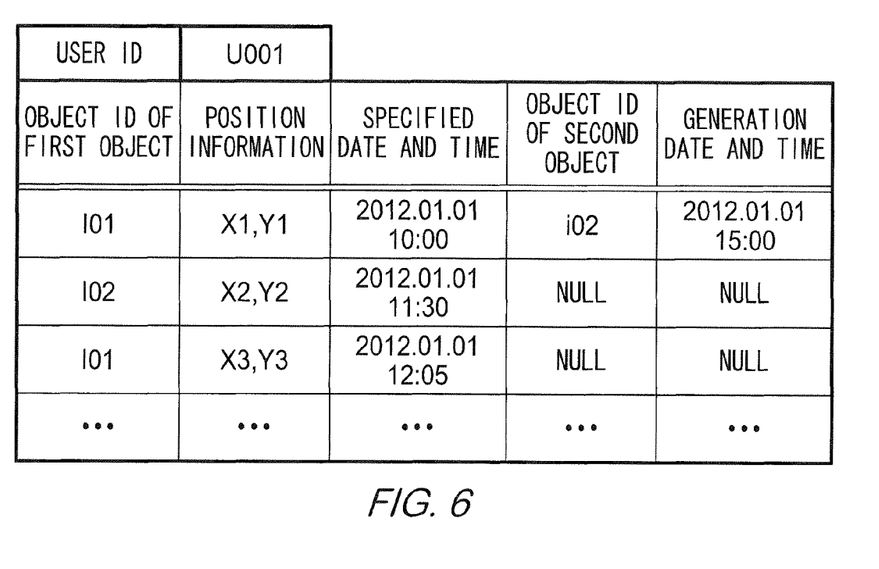
FIG. 6 shows a non-limiting example of a management table.

FIG. 6 is a diagram showing an example of a management table stored in HDD 310. A management table is created for each user, and FIG. 6 exemplarily shows a management table corresponding to a user having user ID "U001." Associated in the management table are: an object ID of a first object; position information expressing a position of the first object specified by a user by geographic longitude and latitude; a specified date and time, which is a date and time at which the position of the first object was specified by the user; an object ID of a second object that has appeared in correspondence with the first object; and a generation date and time when an event of appearance of the second object was generated.

Figure 7:
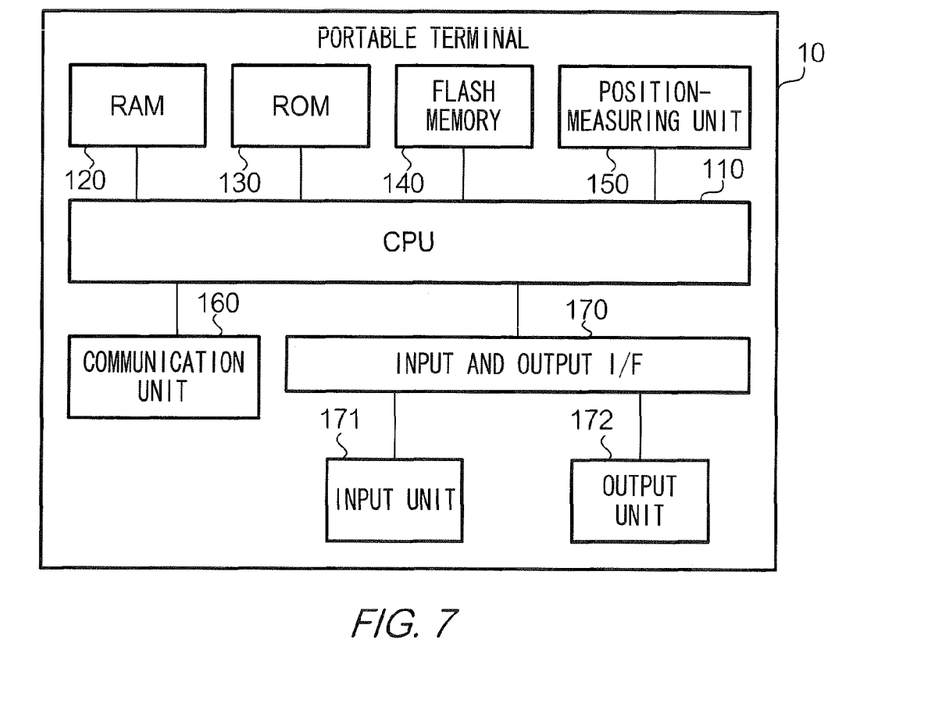
FIG. 7 shows an exemplary non-limiting hardware configuration of a portable terminal relating to an exemplary embodiment.

FIG. 7 is a diagram showing a hardware configuration of portable terminal 10. Portable terminal 10 includes CPU 110, RAM 120, ROM 130, flash memory 140, position-measuring unit 150, communication unit 160, input and output I/F 170, input unit 171, and output unit 172. CPU 110 is an arithmetic device or a control device for controlling other elements of portable terminal 10. RAM 120 is a volatile storage device functioning as a work area when CPU 110 executes a program. ROM 130 is a rewritable, nonvolatile storage device for storing an OS program, which is a base program. Flash memory 140 is a rewritable, nonvolatile storage device. Flash memory 140 stores a program, in which procedures of a role-playing game on the client side are described, and a user ID, which is identification information assigned to a user.

Position-measuring unit 150 is, for example, a GPS unit that measures a position using GPS (Global Positioning System) technology. Communication unit 160 is a device performing communication via a mobile communication network included in communication network 20, and includes an antenna and an amplifier, for example. Input and output I/F 170 is an interface for input of data to CPU 110 and output of data from CPU 110, and is connected to input unit 171 and output unit 172. Input unit 171 is a device for inputting data into CPU 110, and may include a keypad, a touch panel (touch screen), or a microphone. Output unit 172 may include a device for displaying an image based on the data output from CPU 110 and a device for outputting sound based on the data output from CPU 110.

Position-measuring unit 150 is an example of position-measuring unit 11 shown in FIG. 2. CPU 110 and communication unit 160 are an example of notifying unit 12 and receiving unit 13 shown in FIG. 2. CPU 110 and output unit 172 are an example of information-providing unit 14 shown in FIG. 2. CPU 110 is an example of processing unit 15 shown in FIG. 2.

1-2. Operation

1-2-1. Operation Relating to Placement of First Object

Figure 8:
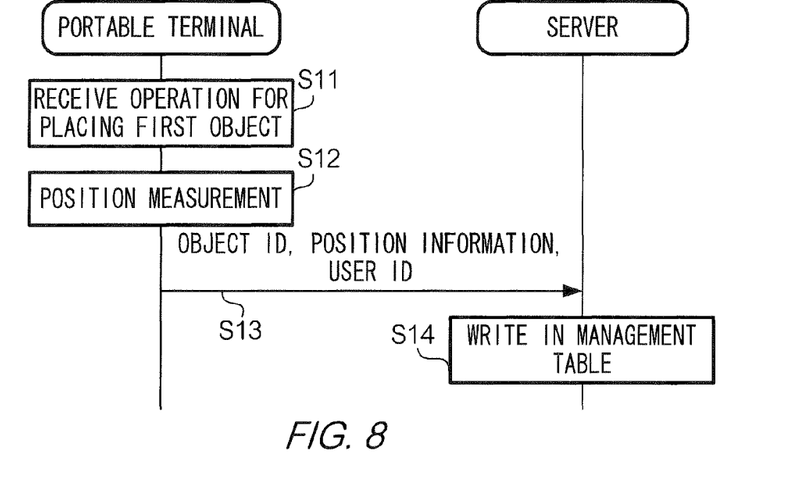
FIG. 8 shows an exemplary non-limiting sequence chart showing a process of placing a first object.

FIG. 8 is a sequence chart showing a process of placing a first object. The user of portable terminal 10 performs a predetermined operation with input unit 171 to place a first object in a virtual space, when the user is using a route that is used frequently by the user in the real three-dimensional space, such as a route used for commuting or walking, for example. The predetermined operation includes an operation of selecting one from among a group of first objects, and an operation of specifying a position in the virtual space corresponding to the current position of the user, thereby to instruct placing of the first object. Upon receipt of this predetermined operation (step S11), CPU 110 of portable terminal 10 causes position-measuring unit 150 to measure the current position to generate position information representing the position of portable terminal 10 (step S12).

Subsequently, CPU 110 transmits, from communication unit 160 to server device 30, the object ID (e.g., "I01") of the selected first object, the generated position information (e.g., "X3, Y3"), and the user ID (e.g., "U001") stored in flash memory 140 (step S13).

CPU 320 of server device 30 receives these items of information via communication unit 350. CPU 320 writes the received object ID and position information in a new record of the management table corresponding to the received user ID, together with the date and time of receipt, such that these items of information are associated with each other (step S14).

As a result, as exemplarily shown in FIG. 6, object ID "I01," position information "X3, Y3," and specified date and time "2012.01.01 12:05" are written in the record in the third line from the top of the management table corresponding to user ID "U001." At this time, no second object is allocated to the record including object ID "I01," position information "X3, Y3," and specified date and time "2012.01.01 12:05," and therefore, the object ID and the generation date and time of a second object are not written.

1-2-2. Operation Relating to Allocation of Second Object

Figure 9:
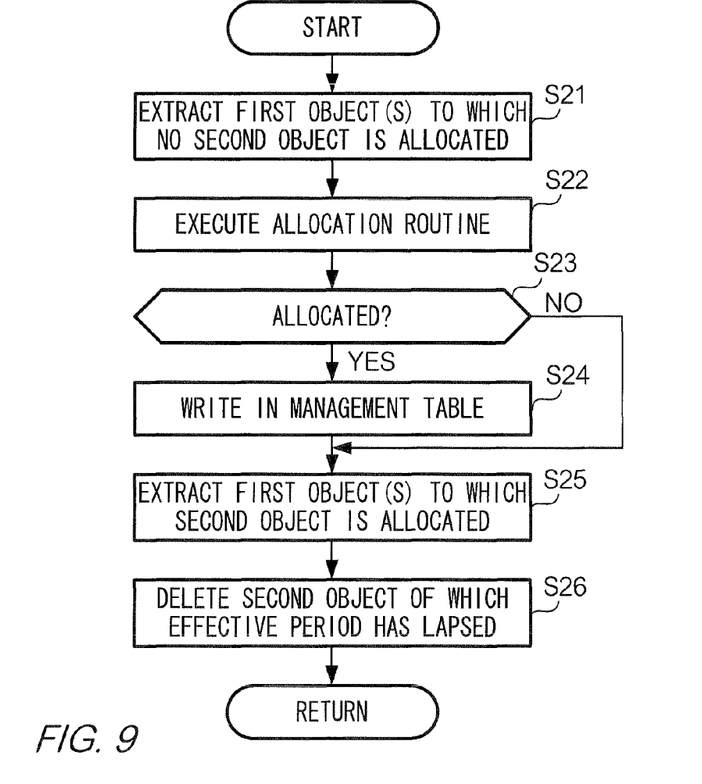
FIG. 9 shows an exemplary non-limiting flowchart showing a process of allocating a second object.

FIG. 9 is a flowchart showing a process of allocating a second object. CPU 320 of server device 30 regularly executes the process shown in this flowchart. First, CPU 320 refers to the management table corresponding to each user, and extracts, from among first objects written in this table, a first object(s) to which no second object is allocated (step S21).

Next, CPU 320 executes a routine for allocating a second object(s) (step S22). Written in this routine is an algorithm for allocating a second object(s) for each first object with a probability of less than one, under a regulation represented as a correspondence relationship between first objects and second objects set forth by the object table exemplarily shown in FIG. 4.

According to one example of such an algorithm, CPU 320 first inputs the object ID of the first object extracted in step S21 into a function, which is designed to output "true" with a probability of less than one (more precisely, with a probability of greater than zero and less than one) for any input of an object ID, whereby CPU 320 receives an output from the function. If the output is "true," CPU 320 specifies, in the object table shown in FIG. 4, the object ID of a second object associated with the object ID of the first object extracted in step S21, and terminates this routine. If, at this time, there are multiple second objects associated with the first object, CPU 320 selects one of them at random, and terminates the routine. On the other hand, if the output is not "true," CPU 320 terminates the routine.

If a second object is successfully allocated (step S23; YES), CPU 320 writes in the management table the object ID of the allocated second object together with the generation date and time of an event where the second object appears (step S24). For example, in the record in the third line from the top in FIG. 6, "i02" is written as an example of the object ID of the second object, and "2012.01.01 19:21" is written as an example of the generation date and time, such that they are associated with object ID "I01," position information "X3, Y3," and date and time "2012.01.01 12:05."

Next, CPU 320 refers to a management table corresponding to each user, and from among the first objects written in the table, extracts a first object(s) to which a second object(s) is allocated (step S25). CPU 320 identifies a record (s) for which a period from the generation date and time written in association with the extracted first object to the current date and time is longer than a predetermined period, and deletes from the management table the object ID of the second object and the generation date and time written in the identified record(s) (step S26).

Thus, when a predetermined period has passed from the time a second object was allocated to a first object (i.e., the time an event was generated), CPU 320 changes a state in which the second object is allocated (i.e., a state in which the event is generated) to a state in which no second object is allocated (a state in which no event is generated). It is to be noted here that the predetermined period is, for example, 24 hours. After the object ID of a second object is deleted from a record in a management table, it becomes possible to allocate again a new object to the first object included in the record.

1-2-3. Operation Relating to Acquisition of Second Object

Figure 10:
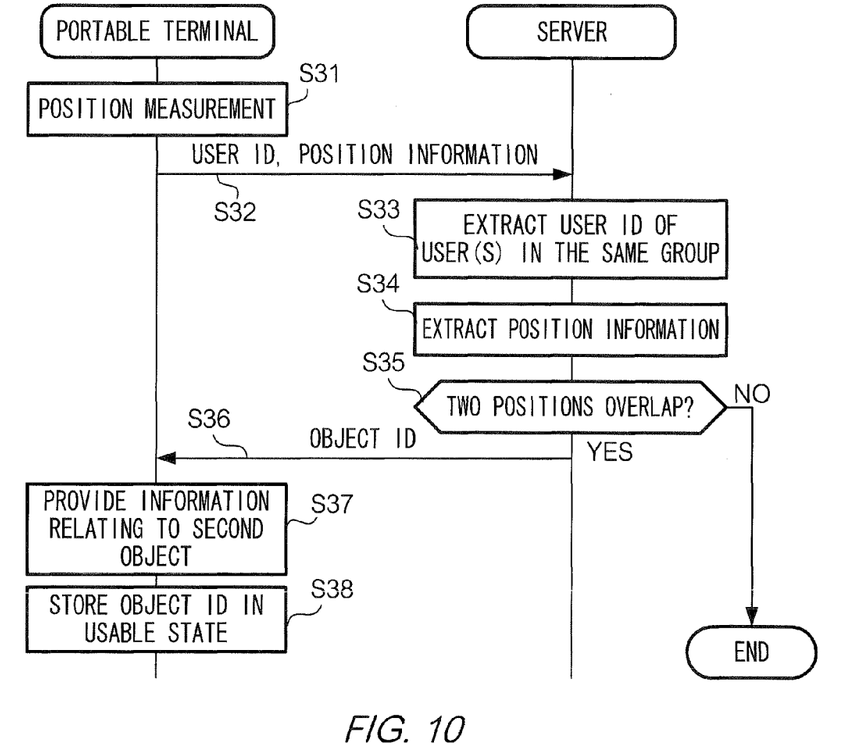
FIG. 10 shows an exemplary non-limiting sequence chart showing a process of acquiring a second object.

FIG. 10 is a sequence chart showing a process of acquiring a second object. CPU 110 of portable terminal 10 regularly performs position measurement using position-measuring unit 150 to generate position information representing a position of portable terminal 10. (step S31). Next, CPU 110 transmits the user ID stored in flash memory 140 and the generated position information from communication unit 160 to server device 30 (step S32).

CPU 320 of server device 30 receives these items of information via communication unit 350. CPU 320 refers to a group table to extract all of the user IDs associated with the group ID of the received user ID (step S33). Subsequently, CPU 320 refers to the management table corresponding to each of the extracted user IDs, to extract position information included in a record in which a second object is written (step S34). Then, CPU 320 determines whether the position represented by the received position information overlaps with a position represented by the extracted position information (step S35). It is to be noted that it may be considered that two positions overlap each other not only when the two positions correspond exactly, but also when at least one of the following two conditions is met: a condition that a region having a predetermined size and covering one of the two positions also covers the other; and a condition that a region having a predetermined size and covering one of the two positions and a region having a predetermined size and covering the other of the two positions overlap each other at least partially. Namely, in step S35, it is determined whether two positions are in a predetermined positional relationship.

When the two positions overlap each other (step S35; YES), CPU 320 transmits, from communication unit 350 to portable terminal 10, the object ID of the second object written in the record including the position information in the management table (step S36).

CPU 110 of portable terminal 10 receives the transmitted object ID via communication unit 160. Then, CPU 110 provides the user with information relating to the second object (step S37). For example, CPU 110 causes output unit 172 to display the second object identified by the received object ID, together with a message "This character has been hit! Do you want to capture it?"

If, in response to the message, the user performs an operation for instructing acquisition of the second object by using input unit 171, CPU 110 stores the received object ID in flash memory 140 in a state that the second object can be used in a virtual space (step S38). Specifically, CPU 110 stores the object ID of the second object in flash memory 140 such that the object ID is associated with a flag indicating that the second object can be used in the virtual space. The second object associated with such a flag may be used for trading with or fighting against another user in the virtual space. If the two positions do not overlap each other in step S35 (step S35; NO), CPU 110 terminates the process.

2. Modifications

Next, various modifications of the foregoing exemplary embodiment will be described. The following modifications may be practiced in any combination, as necessary.

2-1. Modification 1

Modification 1 is different from the exemplary embodiment in the points that, in Modification 1, server device 30 in the exemplary embodiment is not included, and portable terminal 10 operates as a stand-alone device, and that, in Modification 1, there is no concept of a group of users as described in the exemplary embodiment. The other configuration and operation of Modification 1 are the same as those of the exemplary embodiment, and thus, explanation thereof will be omitted.

Figure 11:
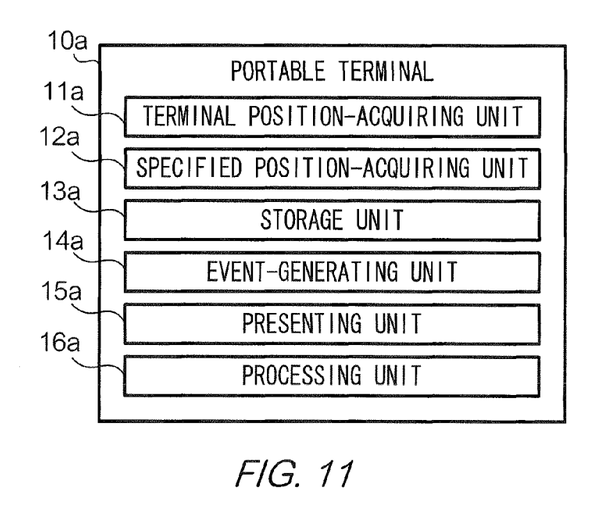
FIG. 11 shows an exemplary non-limiting diagram showing a functional configuration of a portable terminal relating to Modification 1.

FIG. 11 is a diagram showing a functional configuration of portable terminal 10a according to Modification 1. Portable terminal 10a includes terminal position-acquiring unit 11a, specified position-acquiring unit 12a, storage unit 13a, event-generating unit 14a, presenting unit 15a, and processing unit 16a. Terminal position-acquiring unit 11a acquires the position of portable terminal 10a, and performs the same role as that of terminal position-acquiring unit 31 in the exemplary embodiment (see FIG. 2). Specified position-acquiring unit 12a acquires the position specified by the user of portable terminal 10a, and performs the same role as specified position-acquiring unit 32 in the exemplary embodiment. Storage unit 13a stores a first object in association with the position acquired by specified position-acquiring unit 12a, and performs the same role as specified position-acquiring unit 33 in the exemplary embodiment. Event-generating unit 14a generates an event at a generation position with a probability of less than one, based on an algorithm prepared in advance, the position acquired by the specified position-acquiring unit 12*a* being regarded as the generation position. Event-generating unit 14*a* performs the same role as event-generating unit 34 in the exemplary embodiment. Presenting unit 15*a* presents information relating to the generated event to the user, and performs the same role as transmitting unit 35 and information-providing unit 14 in the exemplary embodiment. Processing unit 16*a* executes a process relating to an event in accordance with an operation performed by the user, and performs the same function as processing unit 15 in the exemplary embodiment.

The hardware configuration of portable terminal 10*a* in Modification 1 is the same as that of portable terminal 10 in the exemplary embodiment (FIG. 7). Position-measuring unit 150 shown in FIG. 7 is an example of terminal position-acquiring unit 11*a* shown in FIG. 11. CPU 110 and communication unit 160 shown in FIG. 7 are an example of specified position-acquiring unit 12*a*, event-generating unit 14*a*, and processing unit 16*a* shown in FIG. 11. Flash memory 140 shown in FIG. 7 is an example of storage unit 13*a* shown in FIG. 11. CPU 110 and output unit 172 are an example of presenting unit 15*a* shown in FIG. 11.

In this Modification 1 also, similarly to the exemplary embodiment, a user playing a role-playing game can expect generation of an event where a second object appears at a position intended by the user to be a position where a first object is placed. Therefore, it is possible to allow an intention of the user to influence generation of an event where a second object appears. Further, since the period during which a second object appears is limited, unpredictability or uncertainty relating to acquisition of the second object makes the game more entertaining.

2-2. Modification 2

In the exemplary embodiment, a first object is placed at a position specified by the user. However, placement of a first object is not an indispensable process, and it is possible simply to generate an event at the position specified by the user. Namely, an event may be generated by using only the position specified by the user. In this case, since event-generating unit 34 only generates an event where a second object appears at the position specified by the user, the object table setting forth the correspondence relationship between first objects and second objects as shown in FIG. 4 is unnecessary.

2-3. Modification 3

An event is not limited to an event where a second object appears at the position specified by a user, and may be any event, so long as the event is generated at the position specified by the user. For example, an event may be an event where a change occurs to an object placed at a specified position; for instance, if an object representing a seed or a seedling of a plant is placed at the position specified by the user in the virtual space, the seed or seedling grows into a big plant, or if an object representing garbage is placed at the position specified by the user, the garbage is picked up and removed. Further, an event may be an event where a phenomenon specific to the three-dimensional space occurs, changes, or terminates at the virtual position specified in the virtual space; for instance, rain falls/stops or temperature rises/drops at the position specified by the user in the virtual space.

2-4. Modification 4

The algorithm for generating an event at the position specified by the user is not limited to that described in the exemplary embodiment, and may be any algorithm that generates an event.

Further, though an event is generated with a probability of less than one in the exemplary embodiment, it is possible to set the probability of generation of an event to one, such that an event is generated when a predetermined condition is met. Furthermore, at this time, different events may be generated depending on a certain parameter.

Further, the probability with which an event is generated in the exemplary embodiment may vary depending on one or more conditions prescribed in a program. For example, event-generating unit 34 may generate an event at the position specified by the user with a probability varying in accordance with a kind of event. For example, assuming that, in a case where a second object appears at the position where a first object is placed, there are two kinds of prepared event, in the first of which, a period during which the second object appears is a first period, and in the second of which, a period during which the second object appears is a second period that is longer than the first period, it may be conceived, for example, that event-generating unit 34 sets the probability of generating the first event to A%, while setting the probability of generating the second event to B%, where A and B are values satisfying a condition 100>A>B>0.

Further, event-generating unit 34 may generate an event at the position specified by the user with a probability varying depending on the specified position (namely, the position acquired by specified position-acquiring unit 32). For example, it is possible, based on a predetermined attribute such as population density, administrative district, or geometrical features in the real three-dimensional space, to pre-determine an area in which the event generation probability is relatively high and an area in which the event generation probability is relatively low, such that the event-generating unit generates an event at the position specified by the user with a probability predetermined based on an attribute(s) of an area covering the position.

Further, event-generating unit 34 may generate an event at the position specified by the user with a probability varying depending on when the position was specified (namely, a time the position was acquired by specified position-acquiring unit 32). For example, it is possible to predetermine a time zone or a season in which the event generation probability is relatively high and a time zone or a season in which the event generation probability is relatively low, such that the event-generating unit generates an event at the position specified by the user with a probability predetermined for a time zone or a season including the time when the position was specified by the user.

Further, event-generating unit 34 may generate an event at the position specified by the user with a probability varying depending on an object (a first object in the exemplary embodiment) placed at the specified position (namely, the position acquired by specified position-acquiring unit 32). For example, the probability that a second object appears if bait is placed as a first object at the position specified by the user may be set to be larger than the probability that a second object appears if a trap is placed as a first object at the position specified by the user. Furthermore, the probability that a second object appears if large bait is placed as a first object at the position specified by the user may be set to be larger than the probability that a second object appears if small bait is placed as a first object at the position specified by the user.

2-5. Modification 5

In the exemplary embodiment, in a case where the user specifies a desired virtual position in the virtual space to place a first object at the specified position, the user is required to go to an actual position corresponding to the specified position in the virtual space. For example, in a case where the user places a first object at Tokyo Station as a virtual position in the virtual space, the user is required to go to Tokyo Station as an actual position in the real three-dimensional space. However, when the user specifies a virtual position, the user is not necessarily required to go to the corresponding actual position, and the user may specify a desired virtual position on the map displayed on portable terminal 10, to place a first object at the specified position.

2-6. Modification 6

In the exemplary embodiment, event-generating unit 34 extracts, from among the first objects written in the management table, a first object(s) to which no second object is allocated, and executes an object allocation routine for each extracted first object. However, event-generating unit 34 may execute an object allocation routine for a first object to which a second object is allocated. In this case, there is a possibility that multiple second objects are allocated to a single first object, and the user of portable terminal 10 may acquire all or some of the multiple second objects.

2-7. Other Modifications

The communication performed by portable terminal 10 is not limited to that performed via a mobile communication network, and may be that performed via a wireless LAN (Local Area Network) based on Wi-Fi, for example.

In the exemplary embodiment, the current position is measured by position-measuring unit 150 after a predetermined operation for placing a first object in the virtual space is performed by the user, and the measured position is used as the position specified by the user. The exemplary embodiment is not limited to this, and the specified position acquired by the specified position-acquiring unit may be obtained in any way so long as it represents the position of the portable terminal at the time a predetermined operation is performed by the user. For example, it is possible to perform position measurement regularly with position-measuring unit 150 and to store the measured position, such that the position stored at the time the user performs a predetermined operation for placing a first object (i.e., the position measured immediately before the user operation) may be used as the specified position to be acquired by the specified position-acquiring unit 32.

The hardware configuration for realizing the functions explained with reference to FIG. 2 or FIG. 11 is not limited to the configuration exemplarily shown in FIG. 3 and FIG. 7. A device with any hardware configuration may be used so long as the functions explained with reference to FIG. 2 or FIG. 11 are realized. For example, the functions realized or processes executed by server device 30 explained in the exemplary embodiment, or the functions realized or processes executed by portable terminal 10a explained in Modification 1 may be distributed to multiple devices.

The method of position measurement performed by portable terminal 10 is not limited to a method using GPS. For example, it is possible to adopt a method in which, among base stations of a mobile communication network and access points of a wireless LAN(s), the position of a base station or an access point communicating with portable terminal 10 is detected as the position of portable terminal 10. In this case, position-measuring unit 11 is not necessarily provided to portable terminal 10, and a position-measuring unit may be provided to a control device in a mobile communication network or a wireless LAN or to server device 30.

Portable terminal 10 is not limited to a computer for playing games, and may be a computer other than a game terminal; such as a personal computer, a mobile telephone, a PDA (Personal Digital Assistant), a tablet device, and so on. A program stored in each of portable terminal 10 and server device 30 is not limited to that for a role-playing game, and may be any program for generating an event in a virtual space and presenting the information therefor to the user. Further, the program may be stored in a computer-readable storage medium such as a magnetic storage medium (a magnetic tape, a magnetic disk (an HDD, an FD (Flexible Disk)), or the like), an optical storage medium (an optical disc (a CD (Compact Disc), a DVD (Digital Versatile Disc)), or the like), a magneto-optical storage medium, a semiconductor memory (a flash ROM or the like), and so on. The program also may be downloaded via a network such as the Internet.

What is claimed is:

1. An information-processing device comprising:
    a specified position-acquiring unit configured to acquire a position specified by a user;
    a storage unit configured to store a first virtual object in association with the position specified by the user;
    an event-generating unit configured to generate an event including generation of a second virtual object different from the stored first virtual object to appear in relation to the position specified by the user, with a probability varying depending on one or more conditions including a type of the event, the first object stored at the position specified by the user, and when or where the position was specified by the user,
    wherein the generated second virtual object is to disappear from the position specified by the user when a predetermined period has passed from the time the second object was generated;
    a terminal position-acquiring unit configured to periodically acquire a position of a portable terminal used by the user; and
    a transmitting unit configured to transmit information relating to the generated second virtual object to the portable terminal when the position acquired by the terminal position-acquiring unit and the position specified by the user where the generated second virtual object appears come to be in a predetermined positional relationship.

2. The information-processing device according to claim 1, wherein
    the event-generating unit is further configured to generate the event when a predetermined time has passed from acquisition of a position by the specified position-acquiring unit.

3. The information-processing device according to claim 1, wherein
    the specified position-acquiring unit is further configured to acquire a position of the portable terminal when a predetermined operation is performed by the user.

4. The information-processing device according to claim 1, wherein the event-generating unit is further configured, when the predetermined period has passed from the time the event was generated with the position acquired by the specified position-acquiring unit, to change a state in which the event is generated to a state in which no event is generated.

5. The information-processing device according to claim 1, wherein
    the event-generating unit is further configured to generate the event when a predetermined condition is met.

6. The information-processing device according to claim 5, wherein
the event-generating unit is further configured to generate the event with a probability of less than 1 (one).

7. The information-processing device according to claim 6, wherein
the event-generating unit is further configured to generate the event with a probability varying depending on a type of the event.

8. The information-processing device according to claim 7, wherein
the event-generating unit is further configured to generate the event with a probability varying depending on the position acquired by the specified position-acquiring unit.

9. The information-processing device according to claim 7, wherein
the event-generating unit is further configured to generate the event with a probability varying depending on a period of time during which the specified position-acquiring unit acquired a position.

10. The information-processing device according to claim 7,
wherein the event-generating unit is further configured to generate the event in relation to the position acquired by the specified position-acquiring unit, with a probability varying depending on the first virtual object stored in the storage unit in association with the position acquired by the specified position-acquiring unit.

11. The information-processing device according to claim 1, wherein
the terminal position-acquiring unit is further configured to acquire a position of a first portable terminal,
the specified position-acquiring unit is further configured to acquire a position specified by a user of a second portable terminal,
the event-generating unit is further configured to generate the event, the position specified by the user of the second portable terminal and acquired by the specified position-acquiring unit being regarded as a generation position for the event, and
the transmitting unit is further configured to, when the position of the first portable terminal acquired by the terminal position-acquiring unit and the generation position at which the event is generated by the event-generating unit come to be in a predetermined positional relationship, transmit information relating to the second virtual object to the first portable terminal.

12. An information-processing device comprising:
a specified position-acquiring unit configured to acquire a position specified by a user;
a storage unit configured to store a first virtual object in association with the position acquired by the specified position-acquiring unit;
an event-generating unit configured to generate an event including generation of a second virtual object different from the stored first virtual object to appear in relation to the position specified by the user, with a probability varying depending on one or more conditions including a type of the event, the first object stored at the position specified by the user, and when and where the position was specified by the user,
wherein the generated second virtual object is to disappear from the position specified by the user when a predetermined period has passed from the time the second object was generated;
a terminal position-acquiring unit configured to periodically acquire a position of a portable terminal used by the user; and
a presenting unit configured to present information relating to the generated second virtual object to the user when the position acquired by the terminal position-acquiring unit and the position specified by the user where the generated second virtual object appears come to be in a predetermined positional relationship.

13. The information-processing device according to claim 12, further comprising a processing unit configured to execute a process relating to the event in response to an operation performed by the user.

14. A server device comprising:
a specified position-acquiring unit configured to acquire a position specified by a user;
a storage unit configured to store a first virtual object in association with the position specified by the user;
an event-generating unit configured to generate an event including generation of a second virtual object different from the stored first virtual object to appear in relation to the position specified by the user, with a probability varying depending on one or more conditions including a type of the event, the first object stored at the position specified by the user, and when or where the position was specified by the user,
wherein the generated second virtual object is to disappear from the position specified by the user when a predetermined period has passed from the time the second object was generated;
a terminal position-acquiring unit configured to periodically acquire a position of a portable terminal used by the user; and
a transmitting unit configured to transmit information relating to the generated second virtual object to the portable terminal when the position acquired by the terminal position-acquiring unit and the position specified by the user where the generated second virtual object appears come to be in a predetermined positional relationship.

15. An information-processing method comprising:
acquiring a position specified by a user;
storing a first virtual object in a storage unit in association with the position specified by the user;
generating an event including generation of a second virtual object different from the stored first virtual object to appear in relation to the position specified by the user, with a probability varying depending on one or more conditions including a type of the event, the first object stored at the position specified by the user, and when or where the position was specified by the user,
wherein the generated second virtual object is to disappear from the position specified by the user when a predetermined period has passed from the time the second object was generated;
periodically acquiring a position of a portable terminal used by the user; and
transmitting information relating to the generated second virtual object to the portable terminal when the acquired position of the portable terminal and the position specified by the user where the generated second virtual object appears come to be in a predetermined positional relationship.

16. A non-transitory computer-readable non-transitory storage medium storing a program for causing a computer device to execute a process, the process comprising:
acquiring a position specified by a user;

storing a first virtual object in association with the position specified by the user;

generating an event including generation of a second virtual object different from the stored first virtual object to appear in relation to the position specified by the user, with a probability varying depending on one or more conditions including a type of the event, the first object stored at the position specified by the user, and when or where the position was specified by the user, wherein the generated second virtual object is to disappear from the position specified by the user when a predetermined period has passed from the time the second object was generated;

periodically acquiring a position of a portable terminal used by the user; and presenting information relating to the generated second virtual object to the user when the acquired position of the portable terminal and the position specified by the user where the generated second virtual object appears come to be in a predetermined positional relationship.

17. An information-processing method comprising:

acquiring a position specified by a user;

storing a first virtual object in association with the position specified by the user;

generating an event including generation of a second virtual object different from the stored first virtual object to appear in relation to the position specified by the user, with a probability varying depending on one or more conditions including a type of the event, the first object stored at the position specified by the user, and when or where the position was specified by the user, wherein the generated second virtual object is to disappear from the position specified by the user when a predetermined period has passed from the time the second object was generated;

periodically acquiring a position of a portable terminal used by the user; and presenting information relating to the generated second virtual object to the user when the acquired position of the portable terminal and the position specified by the user where the generated second virtual object appears come to be in a predetermined positional relationship.

18. A communication system comprising a server device and a portable terminal, wherein the portable terminal includes:

a notifying unit configured to notify the server device of a position specified by a user;

a receiving unit configured to receive information transmitted from the server device; and an information-providing unit configured to provide the user with the information received by the receiving unit, and the server device includes:

a specified position-acquiring unit configured to acquire the position specified by the user of the portable terminal and notified from the portable terminal;

a storage unit configured to store a first virtual object in association with the position specified by the user;

an event-generating unit configured to generate an event including generation of a second virtual object different from the stored first virtual object to appear in relation to the position specified by the user, with a probability varying depending on one or more conditions including a type of the event, the first object stored at the position specified by the user, and when or where the position was specified by the user, wherein the generated second virtual object is to disappear from the position specified by the user when a predetermined period has passed from the time the second object was generated;

a terminal position-acquiring unit configured to periodically acquire a position of the portable terminal; and a transmitting unit configured to transmit information relating to the generated second virtual object to the portable terminal when the position acquired by the terminal position-acquiring unit and the position specified by the user where the generated second virtual object appears come to be in a predetermined positional relationship.

19. A communication method comprising:

notifying, from a portable terminal to a server device, a position specified by a user;

acquiring, by the server device, the position specified by the user of the portable terminal and notified from the portable terminal and storing a first virtual object in a storage unit in association with the position specified by the user;

generating, by the server device, an event including generation of a second virtual object different from the stored first virtual object to appear in relation to the position specified by the user, with a probability varying depending on one or more conditions including a type of the event, the first object stored at the position specified by the user, and when or where the position was specified by the user, wherein the generated second virtual object is to disappear from the position specified by the user when a predetermined period has passed from the time the second object was generated;

periodically acquiring, by the server device, a position of the portable terminal;

transmitting, by the server device, information relating to the second virtual object to the portable terminal when the position of the portable terminal acquired by the server and the position specified by the user where the generated second virtual object appears come to be in a predetermined positional relationship; and receiving, by the portable terminal, the information transmitted from the server device; and providing, by the portable terminal, the received information to the user.

* * * * *